Jan. 26, 1926.
B. M. W. HANSON
1,570,831
MEASURING DEVICE
Filed May 21, 1923
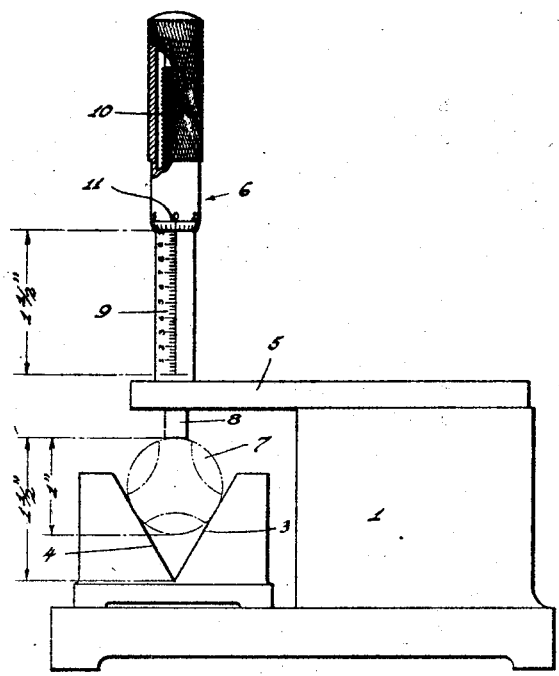
Inventor
Bengt M. W. Hanson
By T. Sluey Lindsey.
His Attorney Patented Jan. 26, 1926.

1,570,831

UNITED STATES PATENT OFFICE.

BENGT M. W. HANSON, OF HARTFORD, CONNECTICUT; EINAR A. HANSON AND CLARENCE E. WHITNEY EXECUTORS OF SAID BENGT M. W. HANSON, DECEASED.

MEASURING DEVICE.

Application filed May 21, 1923. Serial No. 640,352.

*To all whom it may concern:*

Be it known that I, BENGT M. W. HANSON, a citizen of the United States, and a resident of Hartford, in the county of Hartford and State of Connecticut, have invented certain new and useful Improvements in a Measuring Device, of which the following is a specification.

This invention relates to measuring devices and, with respect to its more specific features, to devices for directly indicating dimensions of members, such as the diameters of generally circular parts and the like.

The object of the invention is to provide a measuring device having various features of novelty and advantage and which is particularly adapted for directly measuring diameters of members, such as cylinders and, more particularly, fluted round parts which cannot conveniently be measured between micrometer calipers having parallel opposite contact faces.

Another object of the invention is to provide an improved form of micrometer caliper for measuring fluted members, such as taps or reamers, having an odd number of flutes.

Other objects of the invention will be in part obvious and in part pointed out hereinafter.

The invention accordingly consists in the features of construction, combination of elements and arrangement of parts which will be exemplified in the construction hereinafter set forth, and the scope of the application of which will be indicated in the appended claims.

In the drawing forming a part of this specification there is shown, for illustrative purposes, and in no way in a limiting sense, a measuring device, in side elevation, constructed in accordance with the features of this invention and adapted to measure the diameter of generally circular members; for instance, fluted taps.

Referring to the drawing, the measuring device shown therein includes a base or bed 1 on which is adapted to rest a pair of angularly disposed jaws 3 and 4, and an arm 5 extending laterally over the base and supporting a micrometer 6, the spindle 8 of which is adapted to be moved reciprocally in the direction of the jaws 3 and 4 by the thread 10. The micrometer has a scale 9 on its body portion and a scale 11 on its barrel.

The jaws 3 and 4 may be made integrally or otherwise and may be fastened on the base, but preferably they are slidable thereon so as to permit a member, such as indicated at 7, which they support for measurement, to be moved to any desired position with respect to the micrometer spindle 8.

The members which are more particularly adapted to be measured by this device are such as have a generally circular cross section, such as, for instance, those forms of taps which are provided with an odd number of flutes and which, if placed between the diametrically disposed jaws of an ordinary micrometer caliper, could not be measured on account of the flutes. It will be noted that, if a member, such as a cylinder, shown at 7, be placed between the jaws 3 and 4, the distance from the spindle 8 of the micrometer 6 to the point of intersection of the jaws 3 and 4 will be greater than the diameter of the member 7 being measured.

For any given angle between the jaws there is, irrespective of the diameter of the part to be measured, a definite proportion between the diameter of the part 7 and the distance from the point of contact between the part to be measured and the spindle 8 to the point of intersection of the jaws 3 and 4 and, therefore, in order that the actual diameter of the part may be read directly in standard units of measurement, the scale 9 of the micrometer is made so it bears this relation to a standard unit of measurement, such as the inch. For instance, if the angle between the jaws 3 and 4 is 60°, then the distance from the top of the part 7 to the point of intersection of the jaws 3 and 4 is one and one-half times the diameter of the member 7. Accordingly, the spacing of the units of the scale of the micrometer are made one and one-half times as great as the spacing of an actual unit which has been adopted. That is to say, if it is desired to measure the diameter in inches, the graduations of the micrometer scale 9 will be so spaced apart that an actual distance of one inch and a half will be graduated to indicate a distance of one inch. For instance, in the drawings, the length of the scale 9 as indicated is actually one and one-half inches, but this distance is divided off as if it were an inch. In order to maintain one of the customary or more universally adopted practices, such, for instance, as measuring in the thousandths of an inch, I make the pitch of the threads 10 on the micrometer spindle bear the same relation to the ordinary pitch that the diameter of the piece bears to the distance from the point of contact on the member to be measured and the spindle 8 to the point of intersection of the jaws 3 and 4, and space the graduations on the micrometer barrel correspondingly. More specifically, one of the ordinary pitches of a micrometer screw is 40 pitch and, therefore, where the jaws are at an angle of 60°, I make the pitch of the threads 10 twenty-six and two-thirds and make the graduations on the scale 9 indicate twenty-five thousandths of an inch, and the scale 11 on the barrel one-thousandth of an inch. It will, of course, be noted that, upon one turn of the barrel, the scale 9 will indicate twenty-five thousandths of an inch.

When measuring three-fluted taps, I preferably make the angle between the jaws 3 and 4 sixty degrees since, at this angle, the flutes of the tap may be located intermediate the two jaws and the spindle 8 of the micrometer. However, in measuring five-fluted or seven-fluted taps, I make the angle between the jaws 3 and 4 correspondingly greater, depending upon the number of flutes on the tap, and I change also the lead and graduations of the micrometer accordingly. As has been before mentioned, for any given angle between the jaws 3 and 4, there is a definite proportion between the actual distance measured and the diameter of the member being measured. Therefore, I may increase the lead of the micrometer spindle directly in this proportion to suit the conditions.

The advantage of this direct reading instrument is self evident. In measuring diameters of members, such as taps and the like, if the micrometer indicates only the distance which the spindle 8 were spaced from some point of reference, such as the intersection at the jaws 3 and 4, it would be necessary to calculate the actual diameter of the member being measured from the reading of the micrometer, taking into account the angles at which the jaws were disposed to each other, and this entails a great waste of time which means a loss of efficiency. For instance, suppose that a mechanic employed at grinding taps were provided with a micrometer of the same general character as that shown, except that the graduations were such as to indicate the actual spacing of the spindle 8 of the micrometer from the apex of the angle between the jaws 3 and 4. After taking each reading of the micrometer, it would be necessary for him to multiply this reading by two-thirds in order to find the actual diameter of the member he was measuring. In view of the fact that a mechanic is not apt to be most accurate in mathematical operations, and also in view of the length of time his machine would be idle while making such calculations, errors and loss of efficiency would result. Whereas, if he were provided with a direct reading instrument, such as is here described, there would be practically no loss of time and very little chance of error.

Thus, by the above construction, are accomplished, among others, the objects hereinbefore referred to.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A measuring device of the character described comprising a pair of angularly disposed jaws, and a micrometer having a jaw or spindle provided with threads by which it may be moved toward and from the point of intersection of the first jaws, said micrometer being provided with a scale having divisions indicating standard units of measurement, but spaced apart in proportion to such standard units to designate by direct reading in that standard distances proportionally less than those to which the threads move the spindle upon rotation thereof.

2. A measuring device comprising a pair of angularly disposed jaws and a micrometer having a spindle or jaw opposed to said first mentioned jaws, a body portion in which said spindle is longitudinally movable, a barrel cooperating with said spindle and adapted to move the same longitudinally when the barrel is rotated, there being a scale on the body portion with which said barrel cooperates and which is provided with designations for indicating standard units of measurement, said designations being so spaced apart as to indicate the diameter of any cylindrical body with which the three jaws are in contact.

BENGT M. W. HANSON.